United States Patent [19]

Brutsman

[11] 4,094,446
[45] June 13, 1978

[54] HEATED DISPENSER FOR HOT TOPPINGS AND THE LIKE

[75] Inventor: James W. Brutsman, Cheyenne, Wyo.

[73] Assignee: Wyott Corporation, Cheyenne, Wyo.

[21] Appl. No.: 662,363

[22] Filed: Mar. 1, 1976

[51] Int. Cl.² ............................................. B67D 5/62
[52] U.S. Cl. .............................. 222/146 HE; 219/296; 219/302
[58] Field of Search ............... 222/146 HE, 146 HA; 219/214, 302, 296, 301, 421; 137/341

[56] References Cited

U.S. PATENT DOCUMENTS

| | | | |
|---|---|---|---|
| 2,756,905 | 7/1956 | Wickesberg | 222/146 HE |
| 3,190,502 | 6/1965 | Knibb | 219/301 |
| 3,220,334 | 11/1965 | Martin | 222/146 HE X |
| 3,454,747 | 7/1969 | Hart | 219/301 |

Primary Examiner—Robert B. Reeves
Assistant Examiner—John P. Shannon
Attorney, Agent, or Firm—Edwin L. Spangler, Jr.

[57] ABSTRACT

This invention relates to improvements in a heated dispenser for hot toppings and the like of the type having an immersible pump and spigot subassembly detachably mounted in a removable vessel containing the topping or other pumpable food product which is, in turn contained inside a double-walled electrically-heated housing, such improvement comprising an electrically-heated saddle located atop the rim of the housing is position to cradle the spigot so as to prevent the material therein from congealing while, at the same time, permitting removal of the pump subassembly to gain access to the storage vessel without having to disconnect any wires.

7 Claims, 5 Drawing Figures

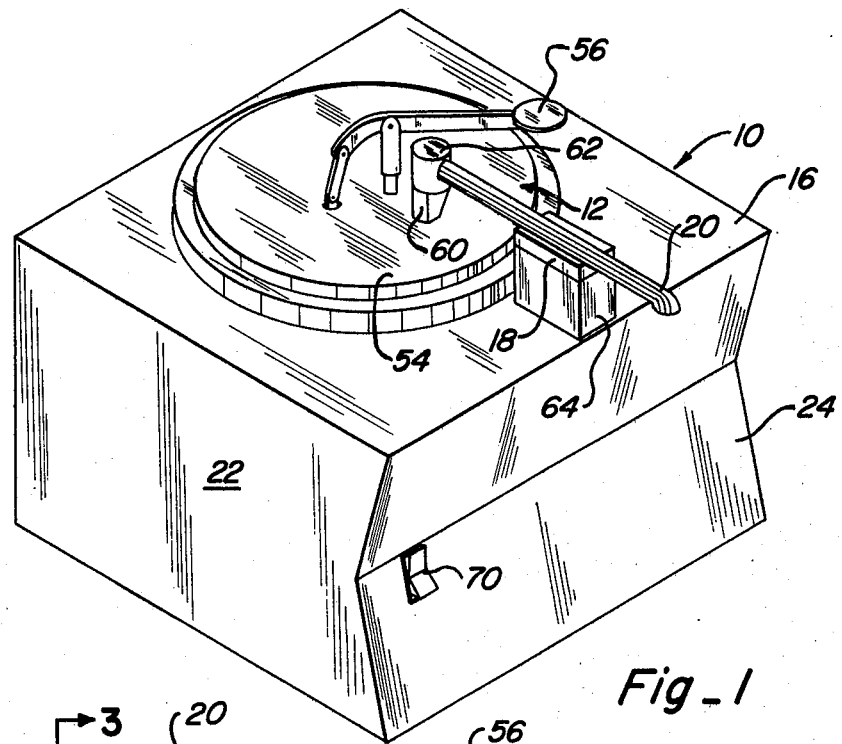
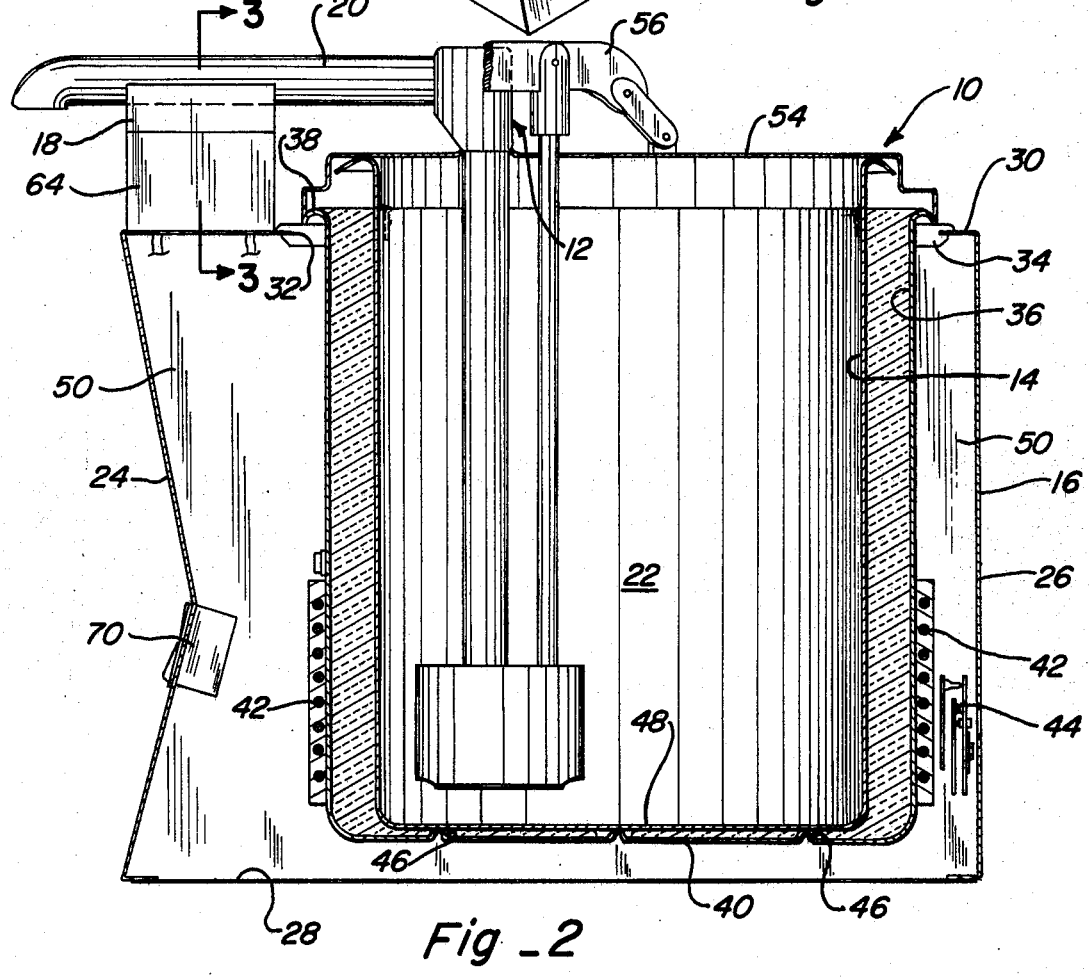
Fig. 1
Fig. 2

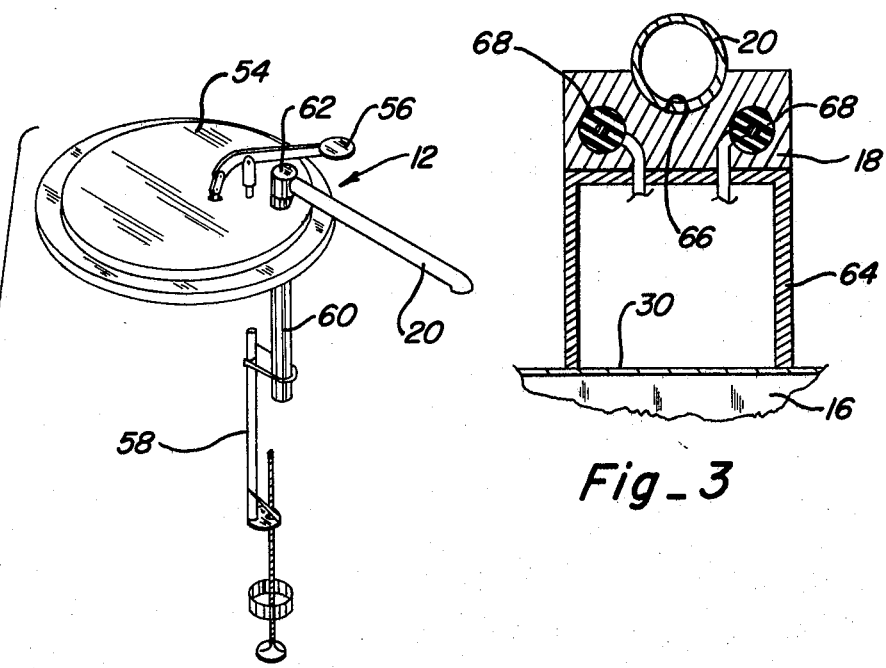
Fig_3
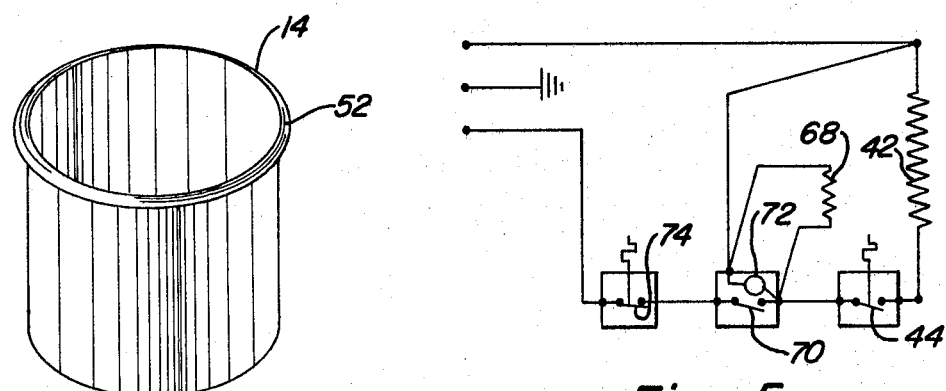
Fig_5
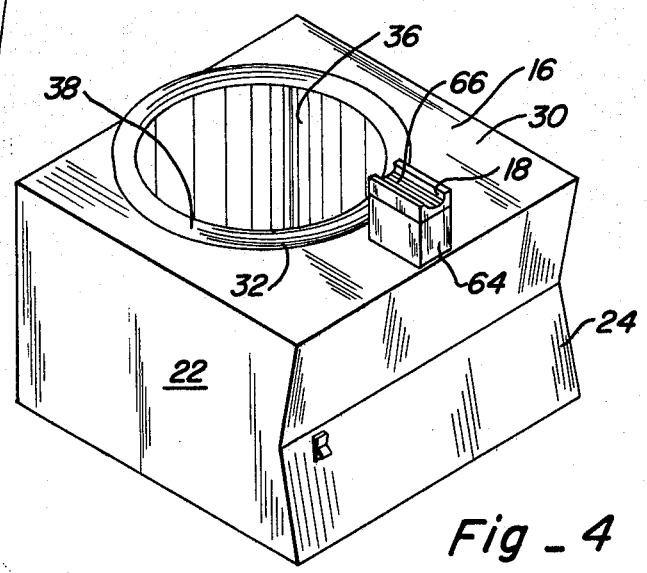
Fig_4

HEATED DISPENSER FOR HOT TOPPINGS AND THE LIKE

Heated dispensers for hot pumpable food products are well known in the art and are widely used in restaurants, drugstore soda fountains, and other commercial eating establishments. While they can be used for soups and liquid food products of this nature, their capacity is usually quite small and, for this reason, ill suited for use as a dispenser of large volumes. As a result, their use is largely confined to such things as ice cream toppings, specifically, fudge chocolate, caramel, and the like which are best served warm, but only require that a small amount be dispensed with each serving.

The problem with these toppings is that they become more viscous and tend to congeal as they cool off. The vessel containing same must be cleaned and restocked frequently and, for this reason, the better prior art hot topping warmers are so designed that such vessel is entirely separate and, therefore, easily removed from the heated jacket or housing that is used to keep the contents thereof warm.

Even more of a problem is the pump subassembly because it clogs up quite easily and must be cleaned frequently to keep the warm contents flowing through its spigot. Actually, the spigot itself is the main source of difficulty because it is exposed to ambient temperatures where the residues contained therein set up and clog its nozzle, whereas, the remainder of the subassembly is kept a good deal warmer inside the heated vessel partially immersed in the warm contents being heated therein.

Heated faucets of one type or another are known in the art such as, for example, those designed for use in outside water lines; however, none of the existing units of which applicant is aware would be suitable for use in the environment of the present invention. The reason for this is that the pre-existing heated faucets either have a self-contained heating element or one more or less permanently affixed thereto. This means, of course, that the subassembly that includes the faucet must be attached in some fashion to a source of electrical energy, usually by conventional current-carrying wires of some sort.

Such a set up is very impractical for use in combination with the pump of a hot topping dispenser as a unitary subassembly because it becomes very difficult to clean the pump. Not infrequently, the pump will have to be soaked to loosen encrusted material inside of it and to make the electrical parts of such a subassembly waterproof is quite costly. While a plug-in type detachable electrical connection between the pump subassembly and the electrical circuit of the heated jacket could, conceivably, be used and rendered waterproof, to do so makes the unit unnecessarily complicated as well as expensive. Conversely, the considerable hazard associated with washing a pump subassembly that is not essentially waterproof and, therefore, immersible are too great to risk. Also, even if the pump subassembly were designed such that it remained contiguous to the heated jacket and did not have to be separated from the latter for periodic cleaning, the problem of removing the vessel containing the topping for cleaning would still exist and, as a general rule, this cannot be accomplished without at least withdrawing the pump subassembly from within such vessel and placing it to one side thereof. Any electrical connection, waterproof or otherwise, is bound to inhibit such an operation.

It has now been found in accordance with the teaching of the instant invention that these and other problems associated with the prior art hot topping dispensers can be completely eliminated by the simple, yet unobvious, expedient of providing the housing with a heated saddle located to cradle the spigot of the pump subassembly and prevent the contents of the vessel being dispensed therethrough from congealing inside. As a result the pump subassembly remains entirely independent of the other elements of the assembly, both from a mechanical and an electrical standpoint in that it can be removed for cleaning without detaching any electrical or mechanical connections. By having the pump subassembly independent of the mechanism used to heat its spigot, all the advantages of the prior art hot topping dispensers are preserved while, at the same time, adding thereto the much needed improvement of a heated spigot.

It is, therefore, the principal object of the present invention to provide a novel and improved dispenser for hot toppings and other food products such as cream soups and chili that create analogous problems.

A second objective is the provision of a device of the type aforementioned wherein the pump subassembly is completely independent of the remaining elements of the assembly insofar as having no electrical or mechanical connections therebetween that must be disconnected in order to disassemble same.

Another object is to provide an electrically-heated saddle for cradling the spigot of the pump subassembly that remains mechanically and electrically associated with the only element of the assembly that remains out of contact with the contents at all times and, therefore, need not be cleaned other than to wipe off its surface, namely, the double-walled housing.

Still another objective of the invention forming the subject matter hereof is the provision of an electrically-heated spigot warmer that heats the latter indirectly by conduction and, for this reason, does not have to be made waterproof and immersible like the pump subassembly of which the spigot is a part.

An additional object of the within described invention is to provide a device of the type aforementioned wherein all the many advantages of the prior art hot topping dispensers are preserved intact while, at the same time, adding thereto the improved dimension of a heated spigot.

Further objects are to provide a combination heater and dispenser of hot toppings and the like which is simple, inexpensive, easy to clean, versatile, sanitary, safe, compact, lightweight and even decorative in appearance.

Other objects will be in part apparent and in part pointed out specifically hereinafter in connection with the description of the drawings that follows, and in which:

FIG. 1 is a perspective view showing the hot topping warmer in its entirety as seen from a vantage point above and to one side thereof;

FIG. 2 is a half section of the unit to an enlarged scale, portions of the pump subassembly having been deleted to conserve space;

FIG. 3 is a still further enlarged fragmentary section taken along line 3—3 of FIG. 2 and showing the electrically-heated saddle cradling the spigot;

FIG. 4 is an exploded perspective view to a somewhat smaller scale than FIG. 1 showing how the several elements of the assembly can be taken apart for cleaning without having to disconnect any mechanical or electrical connections; and, FIG. 5 is a schematic of the electrical circuit used to control both the jacket and saddle.

Referring next to the drawings for a detailed description of the present invention and, initially, to FIGS. 1, 2 and 4 for this purpose, reference numeral 10 has been employed to designate the hot topping dispenser in a general way whereas numeral 12 has been chosen to similarly denominate the pump subassembly, numeral 14 the vessel in which the contents to be dispensed, numeral 16 the double-walled electrically-heated housing encasing the latter, and reference numeral 18 the saddle cradling the spigot 20 of the aforementioned pump subassembly. The double-walled housing 16 includes an outer open-topped metal shell having sidewalls 22, front and rear endwalls 24 and 26 respectively, a bottom 28, and a marginal rim 30 having a circular opening 32 therein which is bordered by a gasket 34. Removably mounted inside outer shell is a marginally lipped open-topped cylindrical jacket 36 that fits down into the opening 32 therein and cooperates therewith to produce the double-walled housing for vessel 14. The upper marginal edge of jacket 36 is provided with an outwardly curled lip 38 that defines a rim supporting the latter atop gasket 34 bordering opening 32 and supporting the bottom 40 of said jacket in spaced relation above the bottom 28 of the shell.

Encircling approximately the lower third of jacket 36 is a coiled resistance heating element 42 controlled by a conventional thermostatically controlled switch 44. The bottom 40 of jacket 36 is ribbed as shown at 46 so as to support the bottom 48 of vessel 14 in spaced relation thereabove (FIG. 2). The hollow space 50 left between the exterior of the jacket and the interior of the shell, of course, not only defines a compartment for the electrical apparatus but, at the same time, insulates the heating element 42 from the shell which would otherwise get quite warm. This space can be, and often is, lined with glass wool or some other suitable insulating material (not shown).

Jacket 36 is, obviously, made detachable from the shell in order to gain access to the electrical components housed therebetween so that the latter can be serviced, repaired or replaced should the occasion arise where this becomes necessary. Except for this, however, few occasions arise where this double-walled housing need be taken apart. None of the contents comes into direct contact with any part thereof other than, perhaps, an occasional spill on the rim or other exterior surface which can be wiped off with a damp cloth.

Vessel 14 is of similar design to the jacket 36 except for the fact that it is narrower while, at the same time, being somewhat taller and has no ribbing in its bottom 48. Its outcurled rim 52 lies spaced inside and above the corresponding rim or lip 38 of the jacket and provides the support for the lid 54 and other elements of the pump subassembly 12 as shown most clearly in FIG. 2. This vessel 14 constitutes the reservoir for the pumpable product to be warmed and dispensed and must, therefore, be repeatedly cleaned and restocked. To remove it, one need only lift out the pump subassembly 12 which includes the lid 54 covering the latter. Restocking vessel 14 is even simpler as the pump subassembly need only be tilted to one side far enough to pour a fresh supply of pumpable product into it.

The pump subassembly 14 is a standard article of commerce and a detailed description of its various components will serve no useful purpose. Palm pressure upon pivoted handle 56 actuates push rod 58 which functions in the well-known manner to force the pumpable product up into riser tube 60 where it enters elbow 62 and is dispensed through spigot 20.

Next, with reference to FIGS. 1-4, inclusive, and particularly FIG. 3, it will be seen that the spigot 20 projects horizontally out over the rim 30 of the shell in spaced relation thereabove. This rim 30, defines a ledge atop which is mounted a small platform 64 supporting the saddle 18 that cradles the spigot and prevents the contents thereof from congealing under ambient temperature conditions. The upper surface of saddle 18 merely includes a trough or groove 66 shaped to closely envelop the undersurface of the spigot and conduct heat thereto from the resistance heating element 68 encased inside thereof (FIG. 3). No electrical or mechanical connections exist between the saddle and spigot or any other element of the pump assembly for that matter. The lid 54 merely rests atop the rim 52 of vessel 14 in the same way that the spigot 20 is cradled within the groove 66 in saddle 18. Thus, the complete removal of the pump subassembly and vessel 12 from the double-walled housing therefor remains uninhibited, whereas, the spigot is heated to keep the contents therein in a fluid pumpable condition.

Finally, with brief reference to FIG. 5, it will be seen that both the heating element 42 for the jacket and the one 68 for the saddle are controlled by a main on-off switch 70 that includes an indicator light 72. A second thermostatically controlled switch 74 is shown which is deployed to prevent an overheating condition other than that governed by similar switch 44 which only responds to the temperature of the jacket heater.

What is claimed is:

1. A heated dispenser for heat-softenable products susceptible of being pumped which comprises: an outer shell with an opening in the top thereof; an open-topped inner shell disposed within the opening in the outer shell cooperating therewith to define a double-walled insulated housing; an electrically powered heating element located between the walls of the housing in position adjacent the inner shell; an open-topped storage vessel removably mounted inside the inner shell of the housing, said inner shell and heating element coacting upon actuation of the latter to produce a heated jacket effective to warm the contents of said storage vessel; a pump subassembly detachably resting atop the storage vessel for removing the contents thereof, said pump assembly including lid-forming means for covering the open top of said vessel, externally-operable pump means extending down into the interior of said vessel through the lid-forming means, and a spigot positioned to receive the output of the pump means and deliver same over the side of the housing; and, means comprising an electrically-heated saddle carried by said housing in position to cradle the spigot of the pump assembly when the latter is in position atop the storage vessel, said saddle being operative upon energization to maintain any heat-softenable residues left within the spigot in a pumpable condition.

2. The heated dispenser as set forth in claim 1 in which: the outer shell includes an upwardly-facing ledge bordering the opening therein; and, in which the saddle is mounted atop said ledge.

3. The heated dispenser as set forth in claim 1 in which: the juxtaposed surfaces of the saddle and spigot are shaped to mate with one another in direct heat-conductive contacting relation.

4. The heated dispenser as set forth in claim 1 in which: the saddle incorporates an electrically-powered heating element connected in a common electrical circuit with the heating element inside the walls of the housing.

5. In a unit for warming and dispensing heat-softenable products susceptible of being pumped which unit includes an open-topped heated cavity, a storage vessel removably disposed within said cavity and pump means for discharging the contents of said vessel when partially submerged therein including a spigot, the improvement which comprises: a heater structurally related to said heated cavity and located alongside thereof in position to cradle the underside of the spigot of the pump means while leaving the remainder thereof unconfined, said heater being operative upon actuation to maintain any heat-softenable residues within said spigot in pumpable condition.

6. The improvement as set forth in claim 5 wherein said pump and heater are mechanically and electrically independent of one another to the extent that the former can be detached from the latter without having to unfasten any connections therebetween.

7. The improvement as set forth in claim 5 wherein the juxtaposed surfaces of the heater and spigot are shaped to mate with one another in direct heat-conductive contacting relation.

* * * * *